(12) United States Patent
Heston et al.

(10) Patent No.: US 11,420,391 B2
(45) Date of Patent: Aug. 23, 2022

(54) CLEANING MECHANISM FOR 3D PRINTER

(71) Applicant: DIABASE PROTOTYPING AND ENGINEERING LLC, Longmont, CO (US)

(72) Inventors: Stephen Heston, Denver, CO (US); Austin Reid, Longmont, CO (US); Richard Warner, Longmont, CO (US)

(73) Assignee: Diabase Prototyping and Engineering LLC, Longmont, CO (US)

( * ) Notice: Subject to any disclaimer, the term of this patent is extended or adjusted under 35 U.S.C. 154(b) by 123 days.

(21) Appl. No.: 16/415,082

(22) Filed: May 17, 2019

(65) Prior Publication Data

US 2019/0351617 A1    Nov. 21, 2019

Related U.S. Application Data

(60) Provisional application No. 62/672,747, filed on May 17, 2018.

(51) Int. Cl.
| | |
|---|---|
| *B29C 64/35* | (2017.01) |
| *B29C 64/118* | (2017.01) |
| *B33Y 40/00* | (2020.01) |
| *B33Y 30/00* | (2015.01) |
| *B29C 64/209* | (2017.01) |

(52) U.S. Cl.
CPC ............ *B29C 64/35* (2017.08); *B29C 64/118* (2017.08); *B29C 64/209* (2017.08); *B33Y 30/00* (2014.12); *B33Y 40/00* (2014.12)

(58) Field of Classification Search
CPC ................................ B29C 64/35; B33Y 30/00
See application file for complete search history.

(56) References Cited

U.S. PATENT DOCUMENTS

| | | | | |
|---|---|---|---|---|
| 2008/0317894 A1* | 12/2008 | Turley | ................... | B29C 48/27 425/226 |
| 2014/0203479 A1* | 7/2014 | Teken | ................... | B33Y 10/00 264/401 |
| 2015/0139960 A1* | 5/2015 | Tumey | ................... | B33Y 10/00 424/93.7 |

(Continued)

FOREIGN PATENT DOCUMENTS

| | | | | |
|---|---|---|---|---|
| CN | 203805207 U | * | 9/2014 | ............... B08B 1/02 |
| KR | 101430582 B1 | | 1/2014 | |
| WO | WO-2020061544 A1 | * | 3/2020 | ............. B22F 3/115 |

OTHER PUBLICATIONS https://www.youtube.com/watch?v=UpfGdCOd6aY (Year: 2013).*

(Continued)

*Primary Examiner* — Nicholas R Krasnow
(74) *Attorney, Agent, or Firm* — Fogg & Powers LLC

(57) ABSTRACT

A novel machine tool featuring a rotary tool changer is disclosed. In one embodiment, the tool changer is pre-tensioned, preferably by a counterweight, to improve repeatability when shifting from one tool to another. In another embodiment, the machine tool is principally a 3D printer, and features a novel cleaning mechanism that improves print quality, especially when printing elastomeric materials. In another embodiment, the machine tool features a rubbing tool that is heated and passed over the surface of a workpiece to improve the smoothness and precision of the workpiece.

18 Claims, 12 Drawing Sheets

(56) References Cited

U.S. PATENT DOCUMENTS

| | | | |
|---|---|---|---|
| 2015/0140147 A1* | 5/2015 | Konstantinos | B29C 64/20 |
| | | | 425/131.1 |
| 2015/0158254 A1* | 6/2015 | Chang | B08B 1/008 |
| | | | 15/3 |
| 2015/0283751 A1 | 10/2015 | O'Neil | |
| 2017/0266891 A1* | 9/2017 | Skubic | B29C 64/118 |
| 2018/0126639 A1* | 5/2018 | Tyler | B33Y 30/00 |
| 2018/0126672 A1* | 5/2018 | Chen | B29C 64/141 |
| 2018/0229426 A1* | 8/2018 | Douroumis | A61L 31/06 |
| 2018/0250845 A1* | 9/2018 | Gaignon | B28B 1/001 |
| 2018/0339465 A1* | 11/2018 | Shih | B41J 2/16538 |
| 2020/0171703 A1* | 6/2020 | Gelbart | B33Y 30/00 |
| 2020/0324341 A1* | 10/2020 | Liu | B22F 3/1055 |

OTHER PUBLICATIONS

GPD—https://www.youtube.com/watch?v=FxC2FAfrZp4 & https://www.gpd-global.com/features-needlecleaner-max2.php (Year: 2016).*

* cited by examiner

CLEANING MECHANISM FOR 3D PRINTER

BACKGROUND

Additive manufacturing, commonly known as 3D printing, has many advantages over more conventional processes such as injection molding and machining. One of the greatest of these is the ability to produce custom parts and assemblies at lower cost than would be possible with conventional methods. In recent years this technique has been applied to such products as prosthetic limbs and replacement joints, which may be easily adapted to the unique structure of a patient's body.

As computers become cheaper and more capable, computer aided design and manufacturing has become more accessible, and there has been an effort to apply 3D printing to less expensive technologies such as orthotic inserts for shoes, and even shoes themselves. Shoes are conventionally manufactured in a variety of sizes and widths to accommodate the feet of customers, and insoles or custom-fit inserts are used to provide support to arches. Additionally, shoes for athletic purposes may incorporate various midsole and upper elements to provide support useful for particular sports. Weightlifters may want ankle support and a hard midsole that does not compress when weight is added. Runners may desire soft cushioning, or firm support to prevent ankle pronation, or some intermediate combination. Wrestlers will prioritize grip and flexibility. This means that despite thousands of shoe choices, a consumer may struggle to find the right combination of fit and performance.

If a shoe, or at least the sole of a shoe, could be produced by additive manufacturing, a consumer could supply detailed measurements of foot shape and a list of requirements for the shoe's performance, and a single pair of shoes could be made to those specifications without compromise. There have been at least two major obstacles to the printing of shoes. One is the difficulty of using elastomeric materials in common types of 3D printers, while another has been the need for a large variety of materials to be precisely aligned to make a successful shoe.

A common form of 3D printing is fused deposition modeling (FDM). In FDM, a filament of solid material is provided to a printhead. The printhead has a motor or other driving mechanism that grabs the filament and pushes it into a heated nozzle, where it melts. It is then extruded out of an orifice in the nozzle, which is positioned close to a work surface or workpiece. The heated liquid emerges as a viscous blob, which, when placed in contact with the work surface or workpiece, bonds to it. The nozzle is then drawn across the workpiece as more material is extruded. The material cools and solidifies, forming a narrow strand of solid material. By building up many layers in this way, a completed object emerges.

Elastomeric materials are difficult to use in FDM systems. Most systems pass the filament through a tube made of Polytetrafluoroethylene (PTFE, commonly known by the trademark TEFLON®) or high density polyethylene (HDPE) to protect it from dirt and damage and to keep the feed angle consistent as the printhead moves around. For hard plastics, these materials have low friction and low chemical reactivity and therefore function very well. However, for rubbery materials, friction with the tube frequently leads to elongation and thinning of the filament. This results in underextrusion and print errors. In severe cases, this elongation can even result in breakage.

An additional challenge when using elastomeric materials in FDM systems is their behavior as they cool and attach to a workpiece. They tend to remain viscous and prone to elongation for longer than hard materials, which can lead to greater fouling of the nozzle. Many nozzles have a shallow conical shape, which results in a face that can easily become covered in soft and sticky melted rubber, necessitating frequent cleaning. But cleaning is itself much more difficult. Whereas harder materials flake off of metal nozzles relatively easily when cooled below their melting point, elastomers tend to tear and come off in small pieces, leaving debris behind. "Nosewiper" systems, which are common in printers intended for hard materials, are an inadequate solution that does not result in a clean nozzle with an elastomeric feedstock.

The layering or combination of different elastomeric materials to make a finished product poses still another challenge. Consider the requirements of a running shoe: the outsole should be wear-resistant, while the midsole should be shock-absorbing. The midsole may also need to have a different composition across the shoe, for instance, firmer towards the medial side of the foot to resist pronation, or softer in the part of the shoe expected to strike the ground first (different runners strike with different parts of the foot). Alignment of these materials with one another is critical to building a shoe that functions as intended. Conventional machining, sometimes referred to as "subtractive manufacturing," has long had solutions to the alignment of parts for different steps of a process. A workpiece may be placed in specially designed jigs or fixtures that cradle them in a repeatable fashion. Alternatively, index points may be identified or designed into a part, giving a "zero" point that serves as a reference for re-starting machining operations after a part is moved. These sorts of solutions can be applied in the 3D printing context, as well, when working with hard materials. They are not practical for elastomeric materials that will deform easily. It is therefore desirable to complete the assembly of all the different parts of an elastomeric workpiece without the need to remove the workpiece from the printer.

The most obvious solution to the use of different materials in a single workpiece is to simply change the feed stock going to the printhead. This is a very slow process and carries the risk of both contamination and the inadvertent shifting of the printhead location during the changeover. Multiple printheads are another known solution. In order to prevent printheads not in use from colliding with the workpiece, it is known to mount printheads on a turret, with the axis of the turret running horizontally. In this configuration, the active printhead is always lower than the inactive printheads, and thus undesirable contact is avoided. However, it can be difficult to precisely return a printhead to exactly the same position after rotation of the turret, and to hold it there despite any resistance it may encounter in the printing process.

For more precise results, it is known to machine 3D printed workpieces after printing is complete. This poses some challenges, however, as a workpiece must be moved off of the printer to a mill or lathe for further work. Aligning the workpiece, especially when it has been deliberately printed larger than the final dimensions, is a particular problem. Machining operations are also difficult to accomplish reliably with elastomeric materials, and there is therefore no repeatable way to improve surface finish or precision of workpieces made using them.

SUMMARY

A novel machine tool is disclosed. In one embodiment, the tool is a 3D printer, and has a plurality of printheads attached to a turret, and the turret is connected to a tensioner that tends to cause it to rotate. In some embodiments the tensioner system involves a counterweight to provide even tension and to assist the machine in lifting the turret vertically, and in some embodiments the tensioner system is complemented by a stop system that halts the turret's rotation in predetermined positions. In another embodiment, the 3D printer features a nozzle for dispensing material with a nose of cylindrical shape, and a plurality of jaws that can clamp down on this nose for the purpose of cleaning. In still another embodiment, the machine tool comprises a heated rubbing tool that smooths the surface of a workpiece made with thermoplastic.

DETAILED DESCRIPTION

Figure 1:
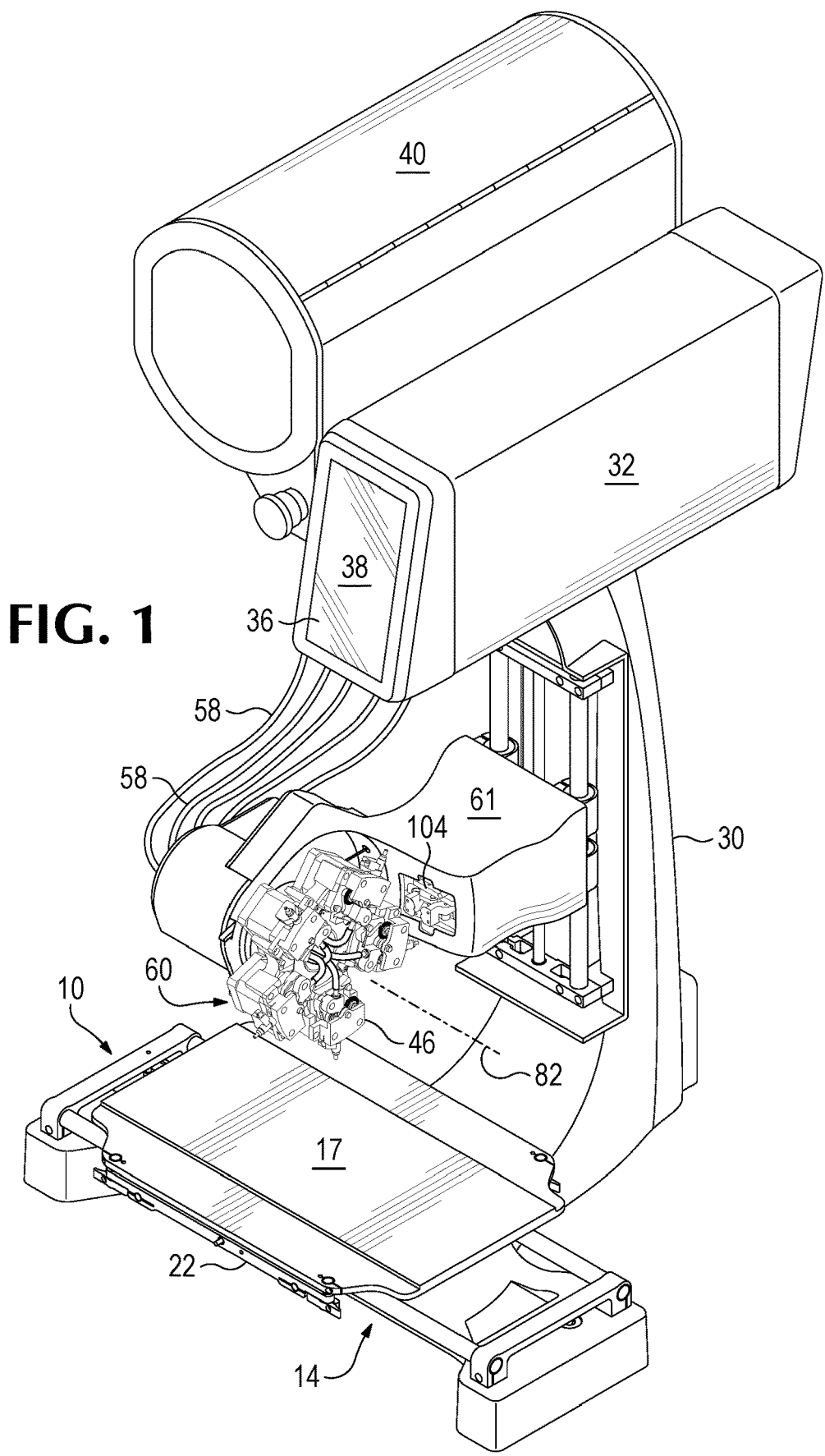
FIG. 1 is a perspective view of one embodiment of a 3D printer.

Machine tools have been widely used in manufacturing since the late 19th century, and since the mid-20th century their usefulness has grown steadily with the introduction and spread of computer controls. The introduction of 3D printing has transformed machining and made possible the production of articles that are literally impossible to make by conventional machining. FIG. 1 shows one embodiment of a machine tool incorporating 3D printing capabilities designed to be placed on a table or workbench. The base 10 of the tool is both wide and deep to ensure stability and rigidity as the components of the printer are moved around during printing. A table 14 sits on the base 10. The table moves relative to the base, driven by actuators (not shown). The actuators may comprise stepper motors, servo motors, or some other form of linear actuator such as hydraulic or pneumatic cylinders. The table 14 may be connected to the motors by leadscrews, toothed belts, chains, a rack-and-pinion system, or whatever other means are convenient (not shown). The table 14 may be mounted on roller or ball bearings, smooth bearing surfaces made of low friction materials such as bronze or plastic, or any other means of lowering friction (not shown). Many methods of both mounting movable tables and driving them precisely to desired positions are known in the arts of 3D printing and conventional machining and may be selected by a skilled artisan according to need.

Figure 10:
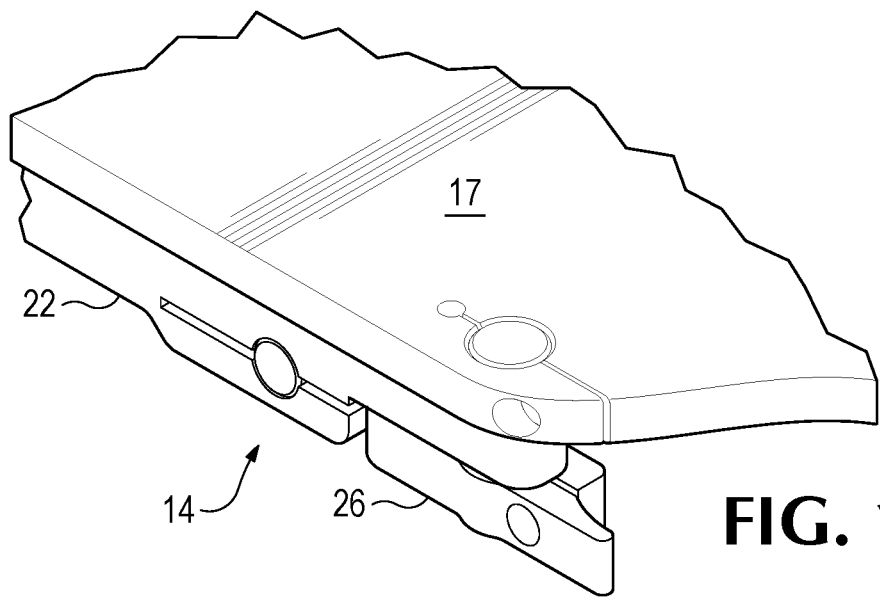
FIG. 10 is a close up of one corner of the print bed, showing the print bed attached to the table by the magnetic latch.
Figure 11:
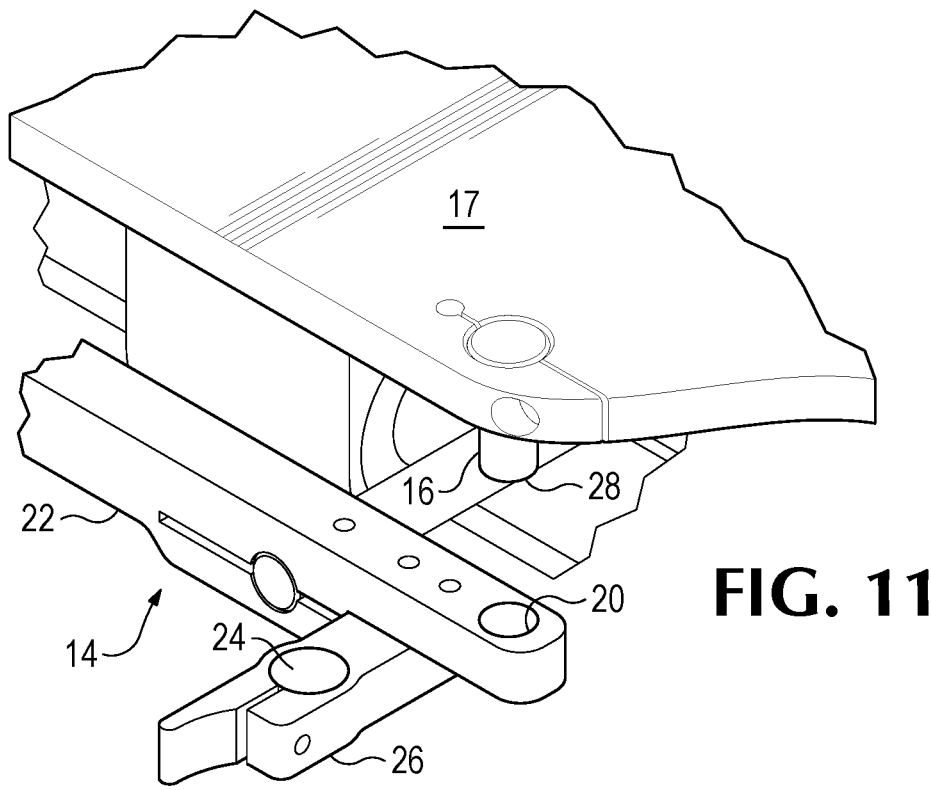
FIG. 11 is a closeup of one corner of the print bed, showing the magnetic latch in the open position and the print bed removed from the table.
Figure 13:
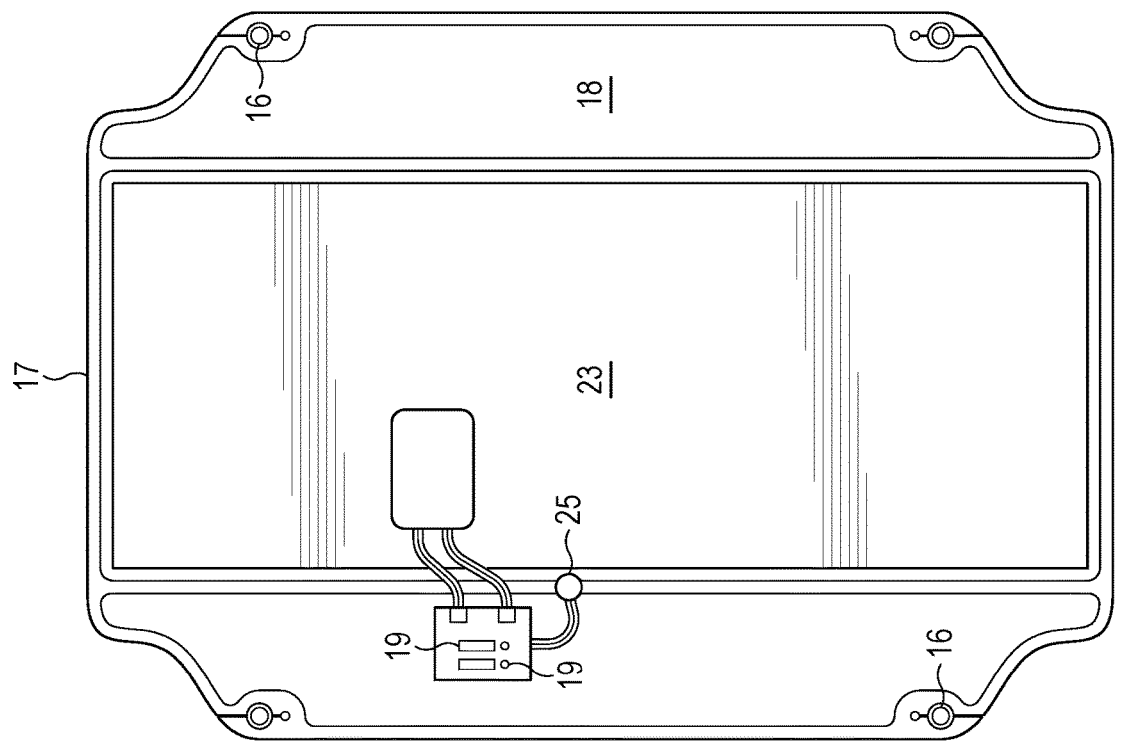
FIG. 13 is a bottom plan view of the print bed showing the contact pads that make an electrical connection with the contact pins, a heating element, and a temperature sensor.
Figure 12:
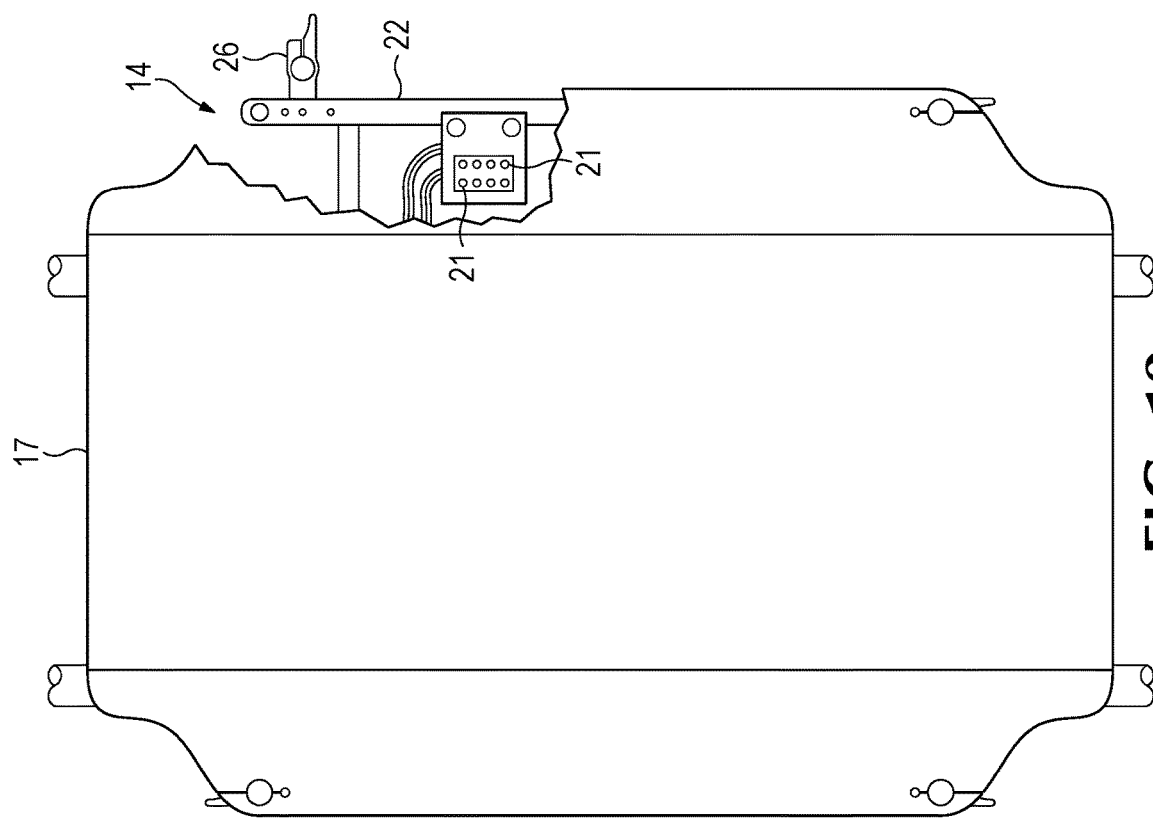
FIG. 12 is a top plan view of the print bed, with part of the print bed cutaway to show contact points mounted on the table for the purpose of making an electrical connection with the print bed.

Atop the table 14 is a print bed 17. In a preferred embodiment, this print bed 17 is detachable from the table 14. The detachable print bed features attachment pins 16 on its lower surface 18. as best shown in FIGS. 10-11. These attachment pins 16 correspond to openings 20 on the table 14. When the attachment pins 16 are placed in the openings 20, gravity pulls the print bed 17 downward into a rigid connection with the table 14. Preferably, the attachment pins 16 and openings 20 are machined with close tolerances to minimize horizontal movement of the print bed 17. At the front 22 of the table 14, magnets 24 are mounted on hinges 26. These hinges 26 pivot horizontally to permit the magnets to pivot toward or away from attachment points 28. The attachment points 28 are at the end of attachment pins 16, and comprise a suitably ferromagnetic material, or alternatively additional magnets (not shown). Thus when the magnets 24 are pivoted to be proximate the attachment points 28, the attachment points 28 and the magnets 24 are drawn to each other, pulling the print bed 17 downward firmly to prevent it from moving. This adds to the force of gravity for increased security. This attachment system is easily removable and permits rapid changes of printbeds during manufacturing. It is not as secure for holding a workpiece as conventional mill tables with t-slots, but the rigidity is more than adequate for fused deposition modeling (FDM) use.

It is also possible, particularly when using the machine tool for routing or conventional machining, to rigidly attach the print bed 17 to the table 14 by means of bolts and nuts (not shown), welds, clamps, or any appropriate rigid attachment method. Furthermore the print bed 17 is preferably flat for 3D printing, but might feature t-slots, dovetails, or threaded holes (not shown) to secure workpieces for machining or other operations.

It is common in the art of FDM to heat the print bed 17 above room temperature, to promote adhesion of the first layer of material. In most cases, this is accomplished by passing an electrical current through at least one flat heating element 23 adhered to the lower surface 18 of the print bed 17. In conventional 3D printers, the print bed is not removable, and thus electricity can be provided by a direct wired connection. However, it would be nonsensical to make a permanent connection (by solder, wire nuts or crimping) to a removable print bed 17, and somewhat inconvenient to have to remember to plug and unplug a connector. Therefore, in a preferred embodiment, there is a set of contact strips 19, made of an electrically conductive material, on the lower surface 18 of the print bed 17. These contact strips 19 are mounted such that when the print bed 17 is placed on the table 14, a set of contact pins 21 are pressed firmly into contact with them. An electrical connection is thereby formed between the contact strips 19 and the contact pins 21. Some of contact strips 19 are insulated from the print bed 17 (others may be used to, for instance, connect the print bed to electrical ground). Some of the contact strips 19 are electrically connected to the flat heating element 23. In this way power may be supplied by the control electronics (not shown) to heat the print bed 17. Additional contact strips 19 may be provided that are connected to a temperature sensor 25, to permit regulation of the print bed 17 temperature. This temperature sensor 25 may be a thermistor, thermocouple, or digital sending unit, or any other means of temperature measurement familiar to those in the art. The control electronics may provide a variable current to maintain temperature, or they may provide a fixed current with a variable duty cycle. Temperature control of this kind is well known in the art. It is possible to arrange more than one flat heating element 23 and temperature sensor 25 to provide more granular control over the printing process. Still other contact strips 19 and contact pins 21 may be provided for connection to whatever devices a user may find relevant, such as strain gauges, position sensors, and the like.

In one embodiment, the printer features a column 30 positioned behind the print bed. This column is rigidly attached to the base 10 and serves as a mounting point for many of the features described below.

Located atop the column 30 is a housing 32 for the control electronics. These may be placed anywhere that is convenient, but by placing them in an elevated position, access to controls 36 and visibility of the screen 38 is maximized. In a one embodiment, the screen 38 is a touch screen, and the controls 36 are implemented by software and found on screen 38 rather than being separate buttons and knobs. The elevated position for control electronics also allows for air circulation to cool the electronics. Although the processing power required to operate a 3D printer is not particularly great, the control of multiple motors simultaneously can generate considerable heat within the motor controllers because of the high currents involved.

Figure 3:
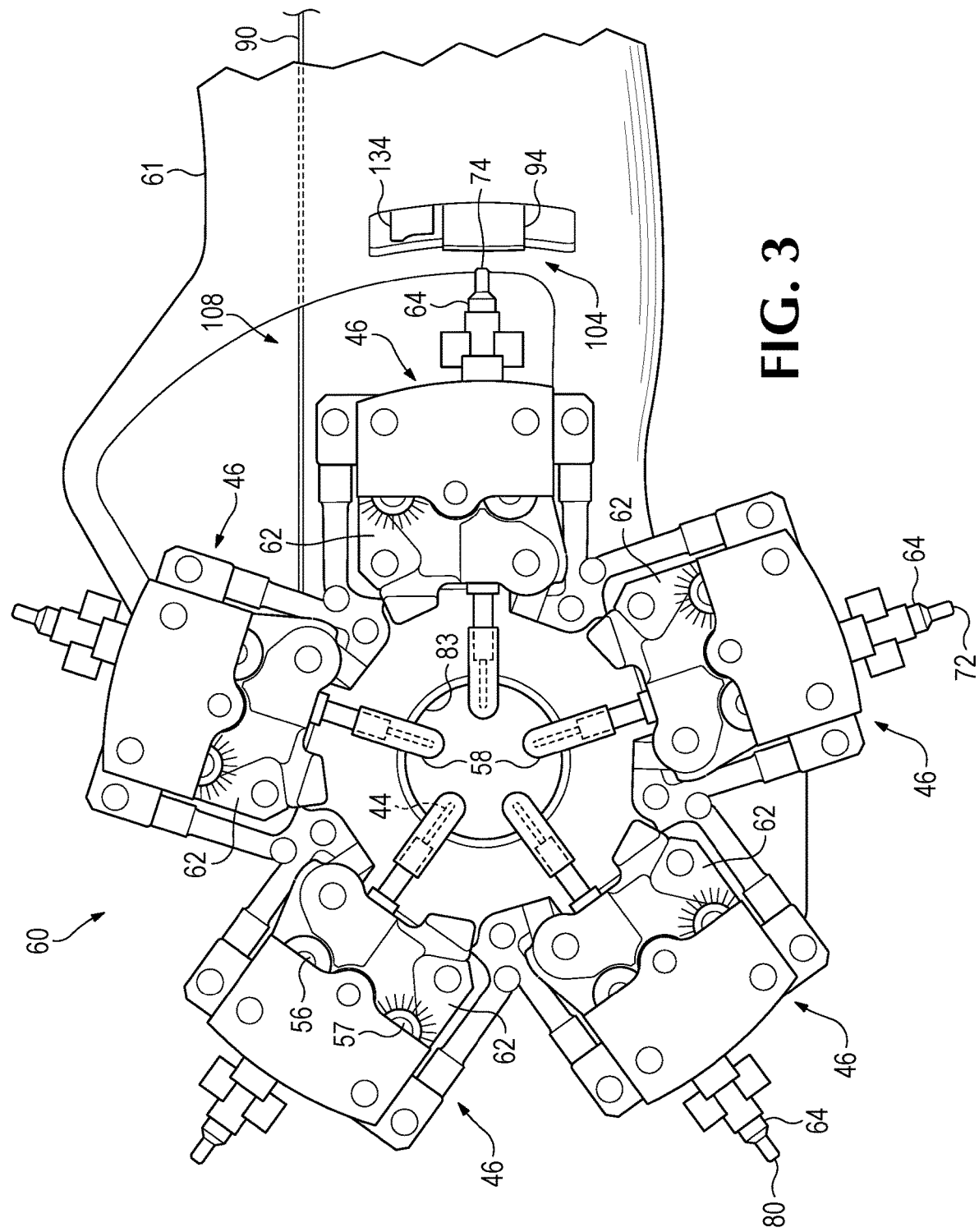
FIG. 3 is an enlarged right side view of the turret found on the printer of FIG. 1, showing the printheads in more detail.
Figure 5:
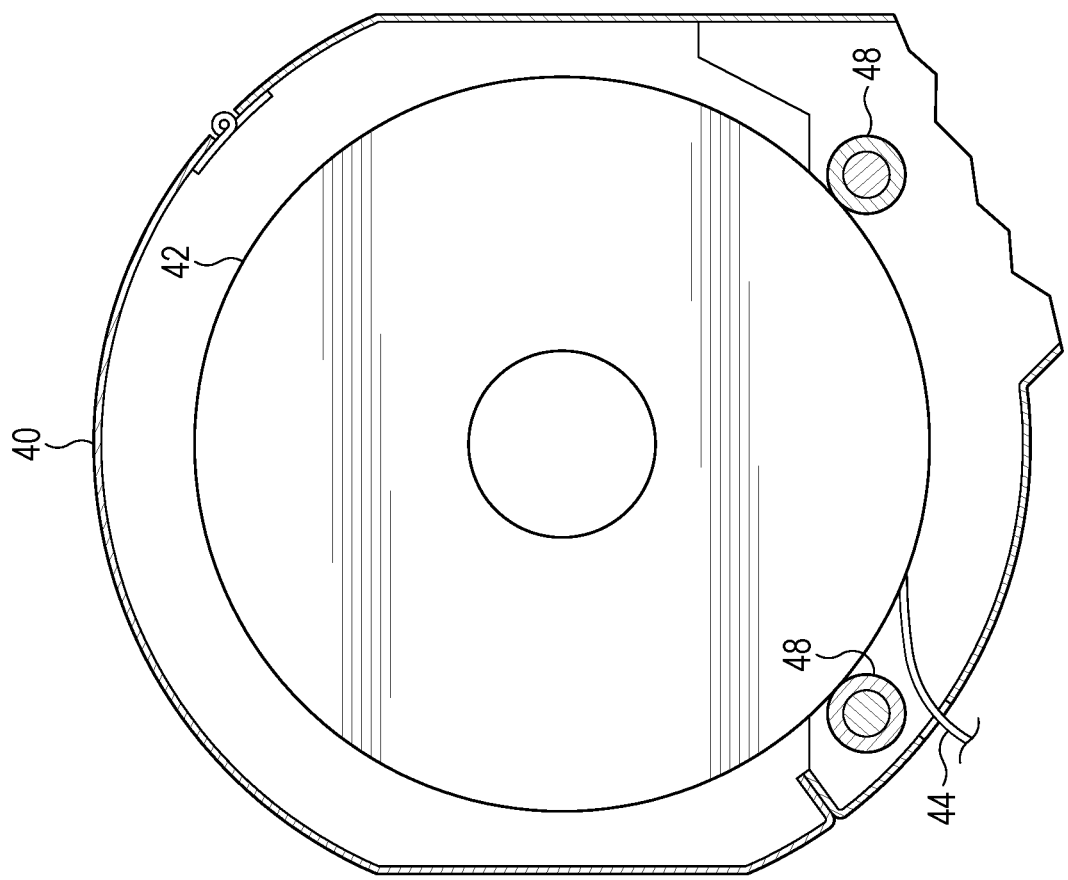
FIG. 5 is a sectional view of the magazine along line 5-5 in FIG. 2, showing a spool of feedstock on trunnion rollers.
Figure 4:
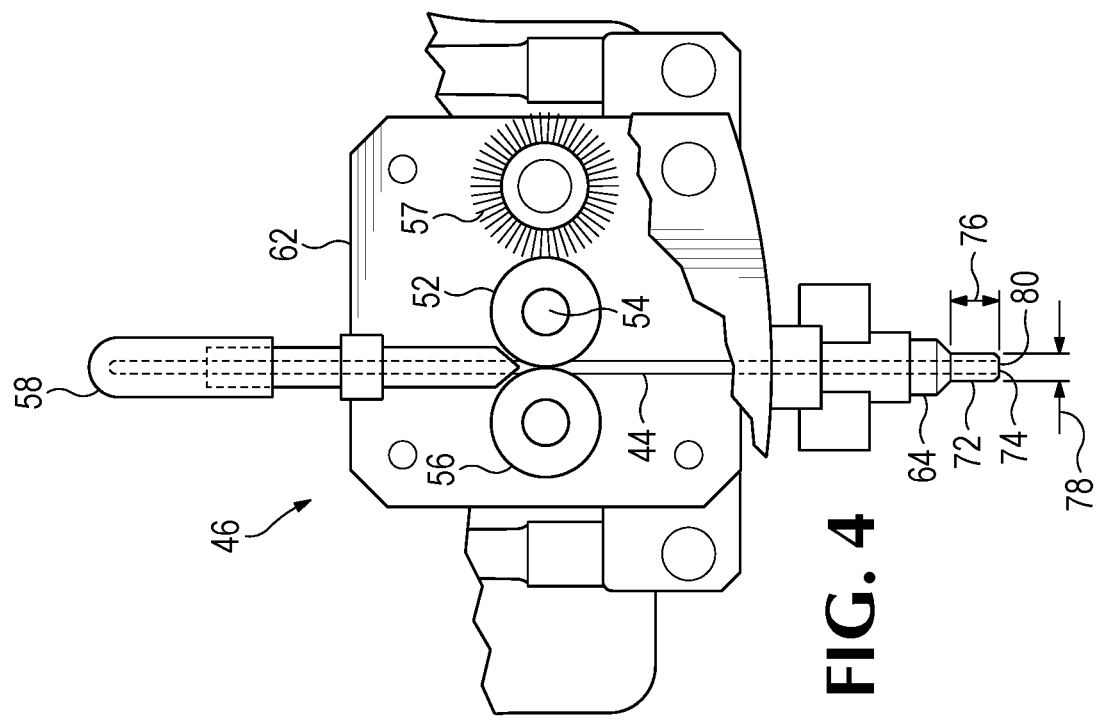
FIG. 4 is a cutaway view of the drive system used on motors for moving feed stock, showing the feedstock guided between a friction wheel and an idler wheel.

Attached to the housing 32 is a magazine 40 containing at least one, and preferably a plurality, of spools 42 of feedstock 44 for the printheads 46. These spools 42 are placed on trunnion rollers 48 so that they may turn freely as the feedstock 44 is withdrawn. Trunnion rollers 48 are preferred to a central shaft for easy of replacement of the spools 42. Preferably, the magazine 48 is fully enclosed, and heated to dry the feedstock 44 before it is withdrawn from the spools 42. At least one push motor 50 is mounted on the housing 32 below the magazine 40 for each spool 42. The push motors 50 are preferably stepper motors with friction wheels 52 attached to their output shafts 54, and placed adjacent idler wheels 56, as best shown in FIGS. 3 and 4. Optionally, brush 57 may be included to continuously clean the friction wheel 52 and minimize contamination of the feedstock 44. The feedstock 44 is placed between the friction wheel 52 and the idler wheel 56, which are spaced so as to squeeze the feedstock 44 with a predetermined amount of pressure.

When energized, the push motors 50 turn the friction wheels 52 and the feedstock 44 is pulled off of the spool 42 and fed into a guide tube 58. The pressure applied by the idler wheel 56 and friction wheel 52 to the feedstock 44 is selected to permit a nonzero amount of slippage, such that at times, the friction wheel 52 may turn without advancing the feedstock 44. However, it is important that the amount of friction attributable to the spool's 42 mounting on the trunnion roller 48 be insufficient to cause slippage.

Figure 2:
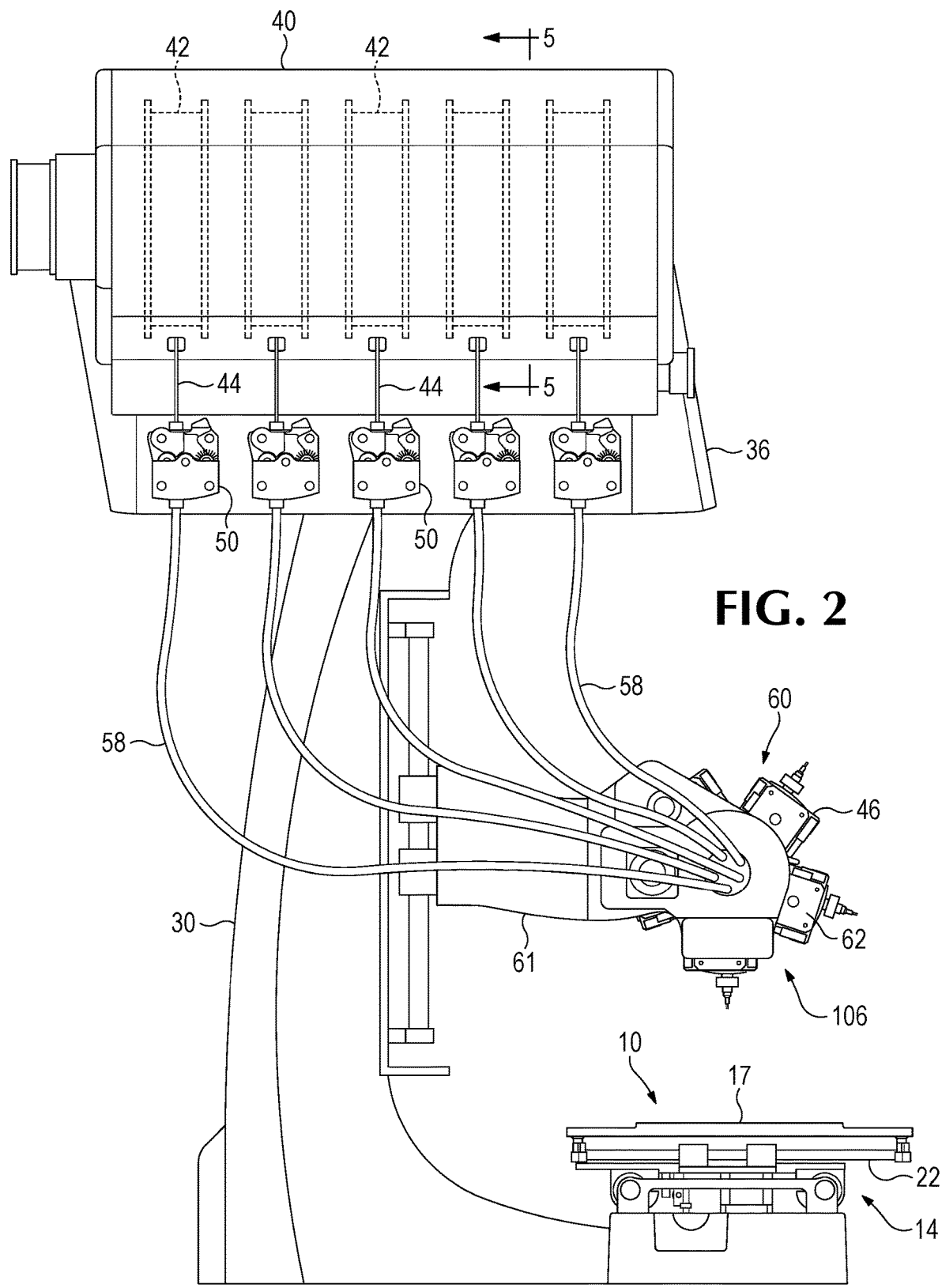
FIG. 2 is a left side view of the printer of FIG. 1, showing one set of motors for driving feed stock and the guide tubes that lead the feedstock to the printheads.

There is at least one guide tube 58 for each type of feedstock 44 in use, as best shown in FIG. 2. The guide tubes 58 are hollow flexible tubes made of a low-friction material, such as PTFE or HDPE, both of which are plastics well known in the art and widely available. The guide tubes run from the magazine 40 to a turret 60, which is attached to turret arm 61. Turret arm 61 is moveably mounted to the column 30. The turret arm 61 must be able to move upward or downward along the column 30 in response to commands. Methods for securely mounting the turret arm 61, such as dovetails, guide rods, and sleeve bearings, and precisely controlling its position, such as leadscrews and servo or stepper motors, are well known in the arts of both machine tools and 3D printers, and any suitable method may be employed. The turret 60 contains at least one, and preferably a plurality, of useful devices. In a preferred embodiment, these useful devices comprise printheads 46, as best shown in FIG. 3. The guide tubes 58 each terminate adjacent a printhead 46, and are affixed to the turret 60 in such a way that the feedstock 44 exists the guide tube 58 in a fixed, predetermined relationship with the printhead 46 that does not change even if the turret 60 moves or rotates relative to the rest of the 3D printer.

Referring to FIGS. 3 and 4, Each printhead 46 comprises a pull motor 62 and a nozzle 64. Each pull motor 62 is similar to the push motors 50 in that it is preferably a stepper motor with a friction wheel 52 mounted on its output shaft 54, adjacent an idler wheel 56. As with the push motors, the feedstock 44 is placed between the friction wheel 52 and the idler wheel 56, where, in contrast to the push motors 50, it is pinched with enough force to ensure that slippage is unlikely. The pull motor withdraws the feedstock 44 from the guide tube 58 and forces it into the nozzle 64. The brush 57 continually sweeps the friction wheel to remove any dirt or debris and prevent it from entering the nozzle 64. For this reason the brush 57 is far more important on the pull motor 62 than the push motor 50.

The useful devices mounted on the turret 60 are not limited to printheads 46. For instance, a user could mount a spindle (not shown) for operation of a rotary cutting tool, such as an endmill, router bit, or key cutter. This is especially useful when combining 3D printing with post-printing machining, resulting in a more precise final product. This is sometimes known as "near net shape" printing. The availability of both operations on a single turret 60 greatly increases manufacturing throughput and increases precision by eliminating the step of moving a workpiece to another machine. Alternatively, a user could mount a liquid dispensing device (not shown) for a non-FDM 3D printing process, such as stereolithography. Liquid dispensers could also be used to apply ink for marking workpieces, or a laser-activated dye, while a laser (not shown) mounted on the turret 60 at another location could be used to engrave a surface coated in such dye. They could also dispense a mist of acetone to smooth the surface of an object printed with Acrylonitrile butadiene styrene (ABS), a common thermoplastic in FDM systems. An edge finder (not shown) could also be mounted to provide periodic positional feedback and ensure that the machine is operating correctly. Anything that might be useful in a manufacturing operation may be employed. It will be understood that while this application discusses "printheads" extensively, the description that follows will also be applicable to other useful devices.

Each nozzle 64 is a hollow tube constructed of a material that conducts heat efficiently, such as brass. The nozzle 64 has a nose 72 of substantially cylindrical shape, and the nose has an end 74. The nose 72 may be slightly conical. However, the length of the nose 76 is preferably longer than the diameter of the nose 78. At the end 74 of the nose 72 is an orifice 80. The nozzle 64 is heated to a predetermined temperature sufficient to melt the feedstock 44 without causing chemical decomposition. Preferably, this temperature is maintained by a thermostat (not shown) within the control electronics. Heating and maintaining temperatures is well-known in the art of FDM systems. As the feedstock 44 is forced into the nozzle 64 by the pull motor 62, it melts. The melted feedstock 44 is pushed out of the orifice 80 by the introduction of solid feedstock 44 pushed by the pull motor 62. By bringing the end 74 of the nose 72 close to a workpiece (not shown) and moving the workpiece relative to the end 74 while simultaneously forcing the feedstock 44 into the nozzle, a thin bead of liquid feedstock 44 may be attached to the workpiece, where it solidifies. This is the conventional method of fused deposition modeling (FDM) except preferably performed with an elastomer.

Preferably, the push motors 50 will push feedstock 44 into the guide tube 58 slightly faster than the pull motors 62 withdraw it. This will prevent both print errors due to underextrusion, and feedstock breakage. The slippage allowed by the push motor's 50 friction wheel 52 will prevent the system from being overloaded and jamming.

Figure 7:
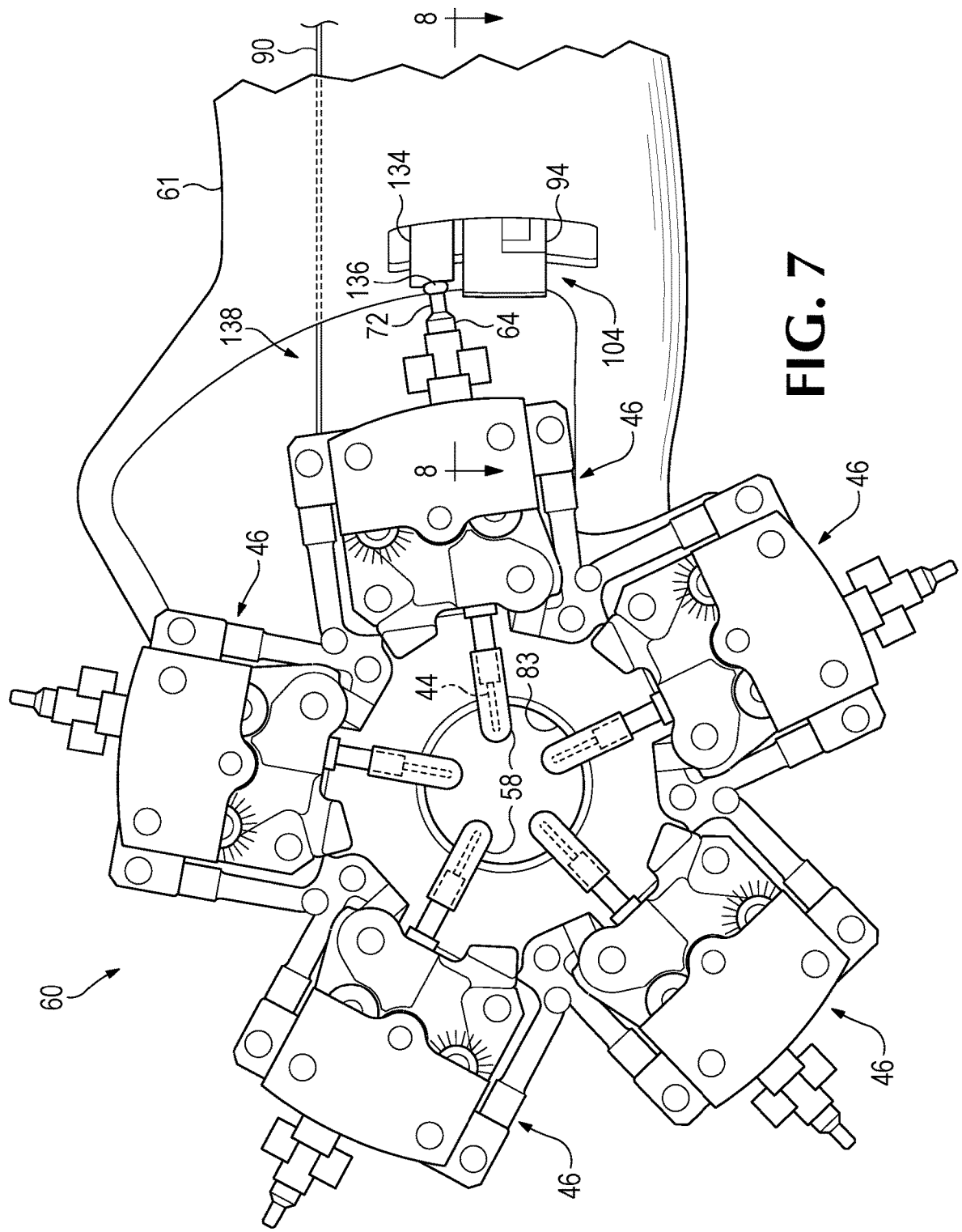
FIG. 7. is a close up right-side view of the turret, showing a printhead in the purge position against the purge block.

The turret 60, best shown in FIGS. 3 and 7, rotates about an axis 82. Preferably, this axis 82 is horizontal, parallel to the print bed 17 but perpendicular to the column 30. A plurality of printheads 46 are positioned around the axis 82 with substantial rotational symmetry, so that by rotation of the turret 60 each of the printheads 46 may be brought to the same position relative to the print bed 17 and any workpiece present. Preferably, the turret 60 has a flattened annular form, and may be made from a flat plate by forming it into a disk and creating a central hole 83 passing through the center of the disk. An annular turret 60 makes a convenient mounting surface, as it may be easily machined at regular angular intervals to accept the attachment of printheads 46. A bearing (not shown) supports the turret 60 and surrounds the central hole 83. The bearing may be a roller or ball bearing available as an off-the-shelf part. Preferably, the axis 82 passes through this central hole 83. The guide tubes 58 may then be passed through the central hole 83 to their respective printheads 46 and affixed to the turret 60 so as to maintain a constant feed angle to the pull motor 62. The turret 60 must be provided with a drive to rotate it into the desired position. In one embodiment, a turret motor (not shown) is a geared stepper motor, connected to the turret 60 with a toothed belt in order to rotate the turret 60. Many other drive options, such as planetary gears, worm gears, or even the energization of electromagnets positioned near the turret 60 (in effect, turning the turret 60 itself into a large stepper motor) are possible.

In order to accurately position the printheads 46 relative to the print bed 17 and workpiece, a set of stop surfaces is employed. Each printhead 46 has at least one turret stop surface 84 associated with it, that rotates along with the turret 60. In one embodiment, these stop surfaces are simply notches 111 cut into a timing wheel 85 attached to the turret 60. A frame stop surface 86 is attached to the printer and interacts with the turret stop surface 84 to halt rotation of the turret 60 in a predetermined position.

Figure 14:
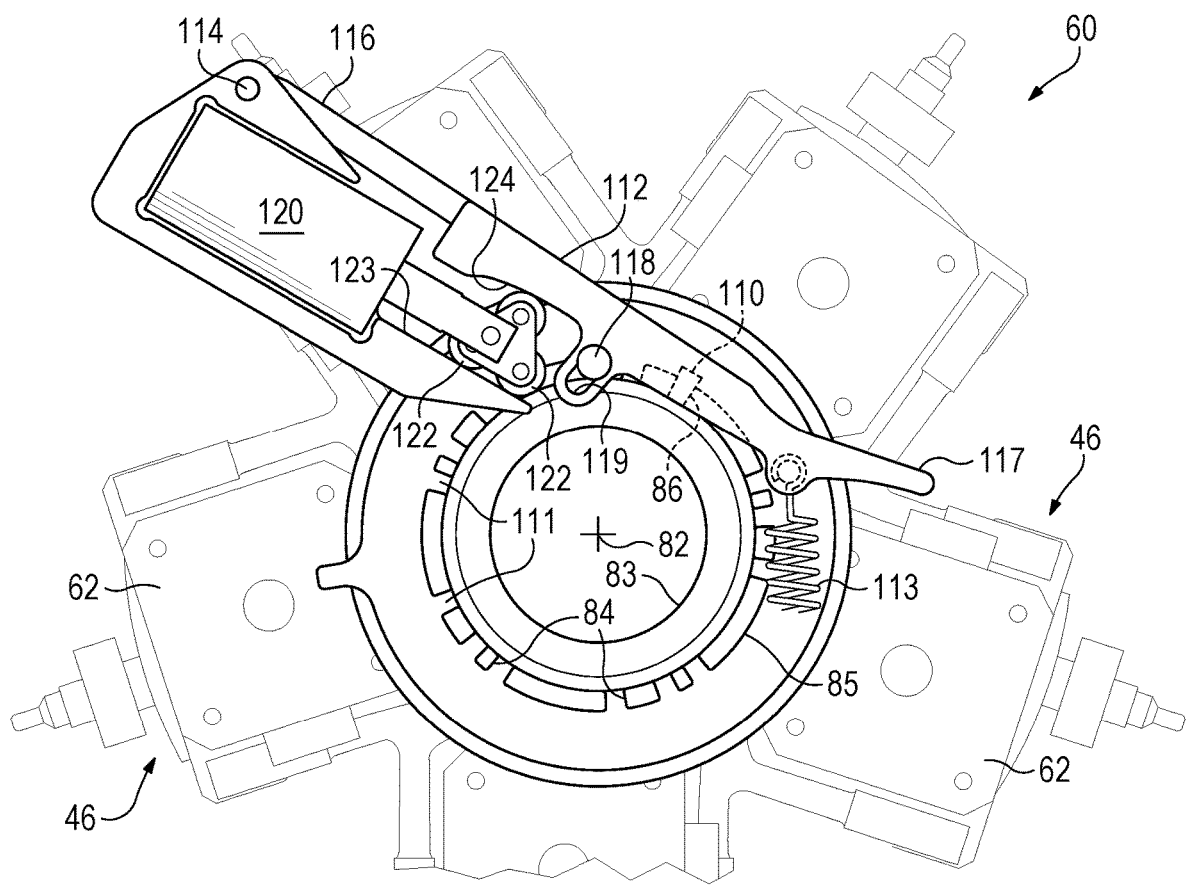
FIG. 14 is a cutaway view of the left side of the turret, showing a locking lever in the locked position, with a pawl engaged in a notch in a timing wheel.
Figure 15:
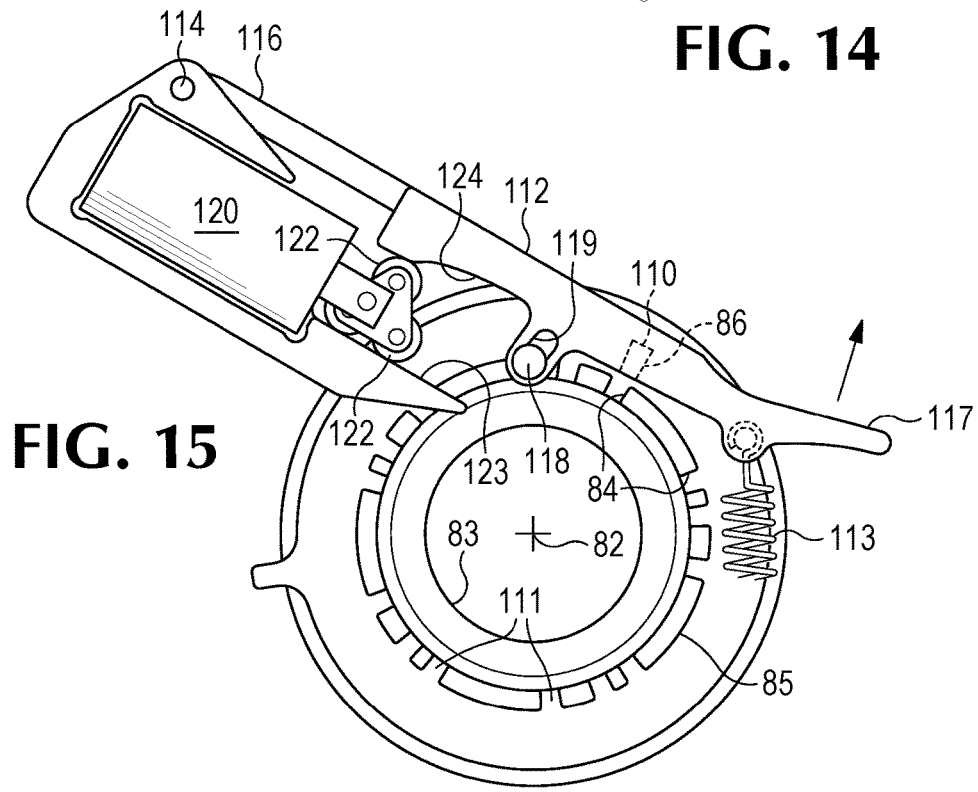
FIG. 15 a cutaway view of the left side of the turret, showing the locking lever in the unlocked position, with the pawl disengaged.

In one embodiment, best shown in FIGS. 14 and 15, the frame stop surface 86 is a pawl 110, which can extend into the notch 111 comprising the turret stop surface 84 to stop the turret 60, or be withdrawn to permit rotation. In a preferred embodiment, the pawl 110 is chamfered at the end to permit it to enter a notch 111 even when slightly misaligned, and to urge the turret 60 to rotate to the correct position.

The pawl 110 is mounted on a lever 112 that is positioned proximate the turret 60, and pivots on a fulcrum 114. In a preferred embodiment, the lever 112 extends outward over the print bed 17 from the column 30, and the fulcrum 114 is found at an end 116 proximate the column 30. A distal end 117, farthest from the column 30, may be manipulated by a user. Between the ends is the pawl 110. The pawl 110 engages the notches 111 to lock the turret when it drops towards the print bed 17, and disengages when it rises away from the print bed 17. Preferably, the pawl 110 is urged towards the notches 111 by a suitable force. This might be the force of gravity, for a lever 112 mounted above the notch 111, or a spring, or an actuator such as a motor or solenoid. In a preferred embodiment, both gravity and a spring 113 combine to urge the pawl 110 into the notch 111.

The pawl 110 may be withdrawn from the notch 111 by actuation of the lever 112. In a preferred embodiment, the lever 112 is moved upward to disengage the pawl 110. This may be accomplished by hand by grasping the distal end 117 of the lever 112 and pushing it upward. It may also be moved automatically by means such as a linear actuator or motor. In a preferred embodiment, the lever 112 is moved, and the pawl 110 thereby withdrawn from the notch 111, by a linear actuator 120, which is preferably a solenoid. Preferably, the linear actuator does not directly apply torque to the lever 112. Rather, it is mounted so that it may move a set of bearings 122 toward or away from the distal end 117 of the lever 112. Preferably, these bearings 122 comprise wheels to minimize friction, but could also be made of fixed but slippery materials. The bearings 122 contact two surfaces: a stationary race 123 and a ramp 124. The stationary race 123 is mounted so that the linear actuator's 120 direction of motion is parallel to it. The ramp 124 is attached to the lever 112 and moves with it, but is not parallel to the linear actuator's 120 direction of motion. As the linear actuator 120 moves in an unlocking direction, the bearing 122 contacting the ramp 124 presses against it and urges it away from the stationary race 123. This causes the lever 112 to move, which in turn causes the pawl 110 to be withdrawn from the notch 111, as best shown in FIG. 15. When the linear actuator 120 moves in the opposite (locking) direction, the restoring force on the lever 112 urges the pawl 110 back into engagement with the notch 111, as best shown in FIG. 14.

In one embodiment, the linear actuator 120 is a solenoid, and the ramp 124 is so shaped as to take advantage of fact that the solenoid's force varies over the length of its travel. Where the solenoid's force is smallest, the ramp 124 is less steep, resulting in less pawl 110 movement, and it becomes steeper in that part of the travel where the solenoid exerts a greater force.

In order to retain the lever 112 in the proper operating position, the lever 112 is fitted with a lever stop slot 119. A screw or pin 118 is placed in the lever stop slot 119 and serves to both limit the lever 112's range of motion about its fulcrum 114 and limit the lever's 112 movement to a single plane.

In order to permit larger tolerances for the stop surfaces 84, 86, and also to minimize inconsistency and backlash, it is preferred to provide a tensioning mechanism that tends to urge the turret 60 to rotate in one direction, thereby urging the turret stop surface 84 firmly and repeatably into contact with the frame stop surface 86. There are many forms of tensioner known, including ribbon springs, such as the mainspring of a mechanical watch or the spring found in a common metal tape measure, helical torsion springs familiar from mousetraps, coil springs in tension or compression, rubber elastomers, or magnets, electromagnets, and even motors designed to operate in a stalled condition. Each of these can serve the necessary function.

Figure 6:
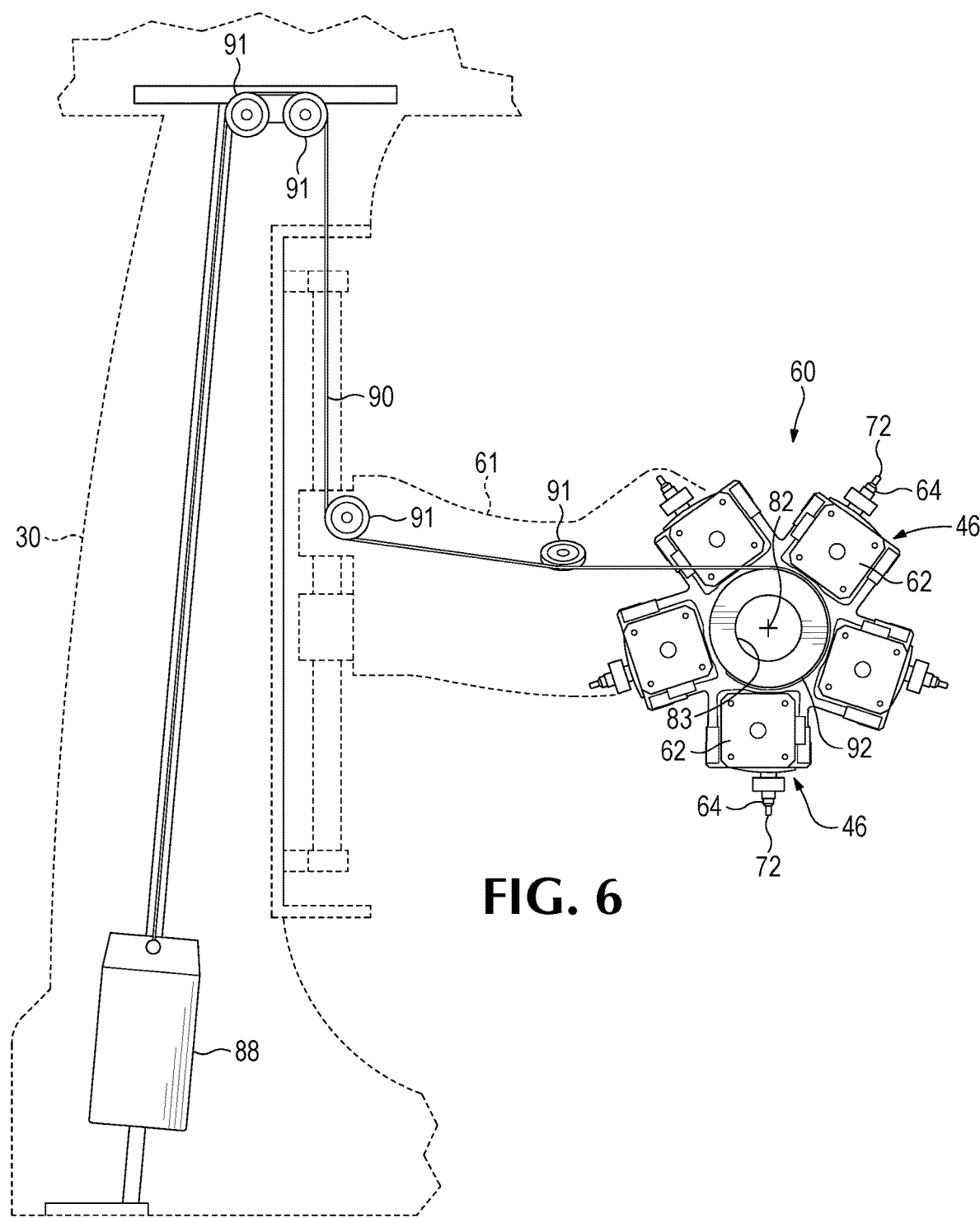
FIG. 6 is a cutaway left-side view of the printer of FIG. 1, showing the counterweight tensioner system.

In a preferred embodiment, the tensioner employed is a counterweight 88 suspended within or adjacent the central column 30 connected to the turret 60 by a cable 90 that passes over pulleys 91, as shown in FIG. 6. Preferably, the turret 60 has a curved surface 92, preferably forming a circular arc concentric with the axis 82, over which this cable 90 is passed. The cable is then fixed to the turret 60, so that the linear pull of the cable 90 is converted to a torque by the pressure on the curved surface 92. Preferably, curved surface 92 will be a complete circle, and the cable 90 will be able to wrap all the way around curved surface 92 for at least one complete revolution. The counterweight 90 coupled with the circular curved surface 92 has the advantage over other tensioners that the torque applied is consistent regardless of the turret's 60 angular position. This assists in repeatable positioning because the same stress is applied to the stop surfaces 84, 86 and the flexion of the machine as a whole is consistent no matter the position of the turret 60. In addition, the counterweight can, when mounted as shown with a pulley 91 on the turret arm 61, reduce the force necessary to raise the turret arm 61 against the force of gravity, and thereby permit smaller motors to be used for control of the turret arm 61's vertical position. A counterweight also permits whatever means is used to rotate the turret 60, such as turret motor 63, to be optimized to a specific counterweight 88. If for some reason a variable torque is desired, it can be achieved by altering the curved surface 92, either making it non-circular or mounting a circular surface so that it is centered somewhere other than the axis 82.

During operation, melted feedstock 44 may build up on the nozzle 64 of printheads 46, resulting in imprecise placement of material on, or in some cases even damage to, a workpiece. This problem is well known in the art, and many 3D printers feature a cleaning system designed to minimize the problem. The most common cleaning system is a "nosewiper" system, sometimes accompanied by a purge step, as described in U.S. Pat. No. 6,305,769 to Thayer et al. These systems typically place the printhead over a cleaning station, where some quantity of feedstock is fed while the nozzle is not in contact with or adjacent to anything. This permits dirt or other contaminants to be forced out of the nozzle by liquid feedstock. The nozzle is then passed over a wiper blade (not shown) similar in function to windshield wipers on automobiles. The wiper blade scrapes the face of the nozzle, removing excess feedstock and any contaminants that have been purged. The wiper may be made of a flexible material such as rubber to conform to the nozzle face, or it may be made of a stiffer material such as sheet metal to maximize the cleaning effect. Typically the nozzle face will be flat or have a very shallow conical shape to facilitate cleaning in such a system. Such a system is not shown in the drawings because it is well known in the art and does not form a part of this disclosure.

Nosewiper cleaning alone has been found to be unsatisfactory for elastomeric feedstocks. Due to their softer nature, elastomeric materials are more sticky and glue-like when melted, and are therefore more inclined to adhere to surfaces. A nosewiper system tends therefore to leave a thin film of elastomer on a nozzle. Even when fully cooled, elastomers defeat nosewipers because they elongate and break, resulting in patches of clean nozzle and patches of contamination.

Figure 8:
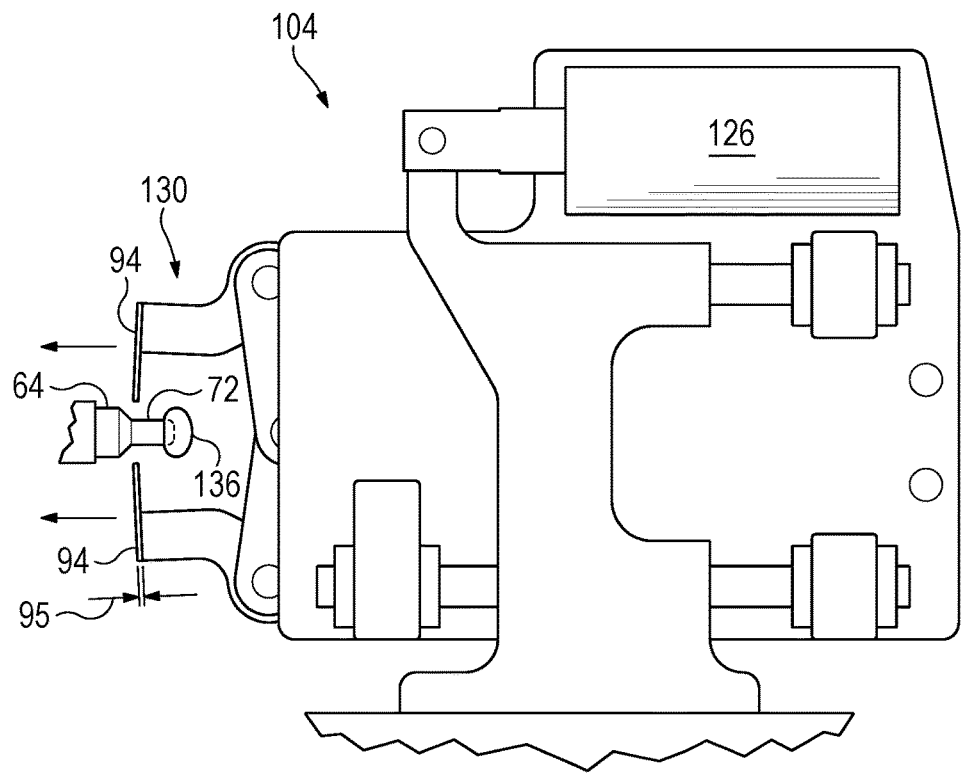
FIG. 8 is a detailed view of the cleaning system showing the jaws open and ready to clean the nose of a printhead
Figure 9:
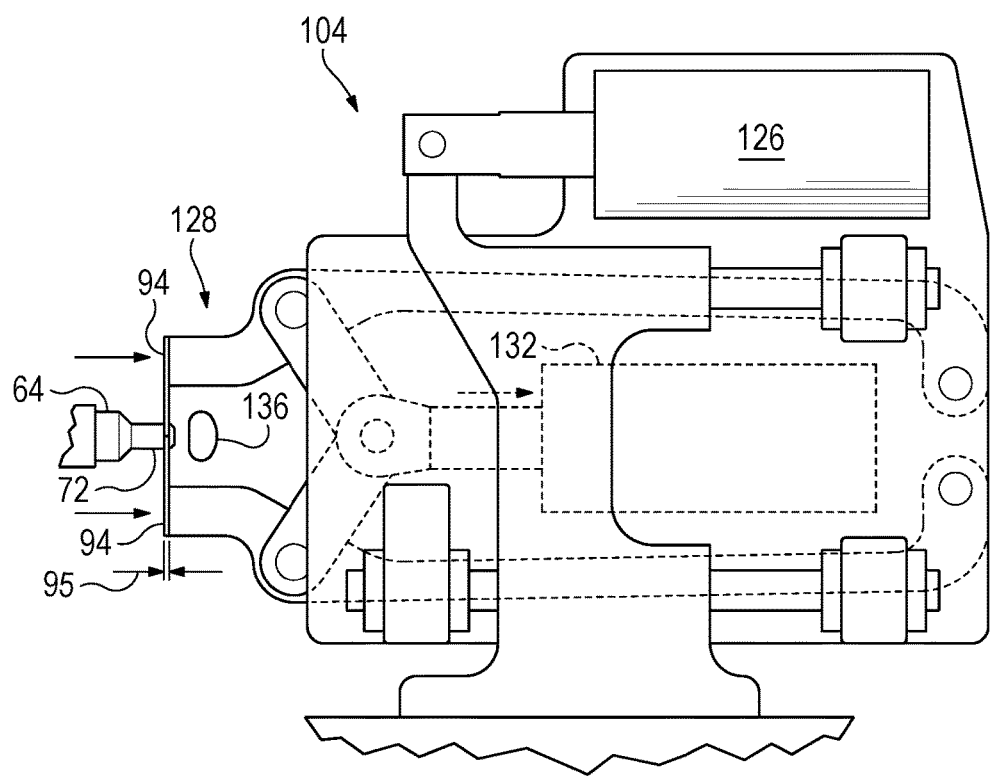
FIG. 9 is a detailed view of the cleaning system showing the jaws closed about the nose of the printhead and moving so as to remove debris.
Figure 16:
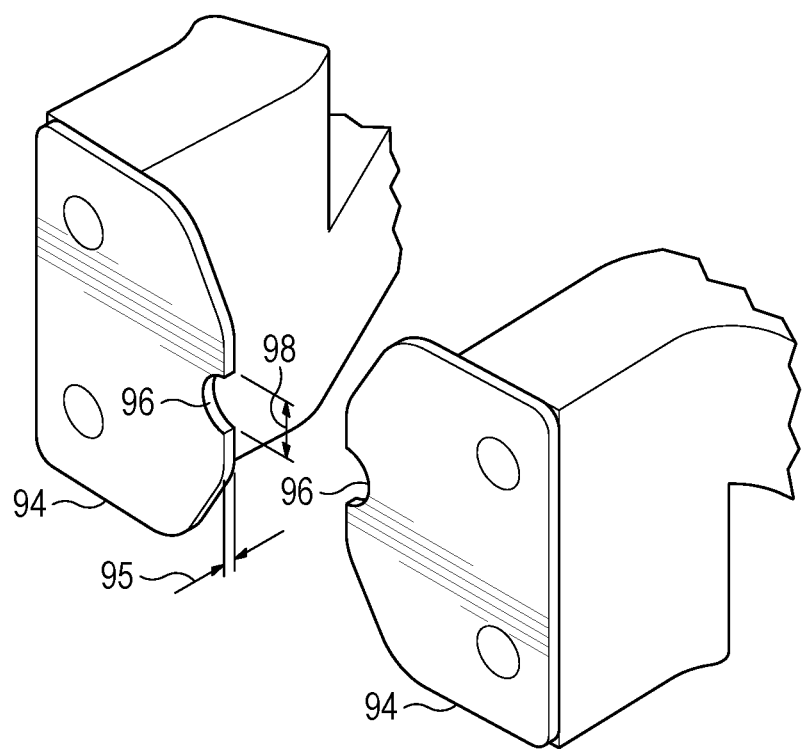
FIG. 16 is a perspective view of the cleaning station, showing the shape of the jaws.

A novel cleaning system has been found effective in automatically maintaining clean nozzles 64 when printing with elastomers, shown in FIGS. 7-9. The nozzle 64 has a nose 72 that extends downward, which is longer than those in common use. Preferably, the nose 72 has a substantially cylindrical form with a round cross-section, although other cross-sections are possible. It may have a somewhat conical form, but unlike the shallow cones of conventional 3D printers, the overall length 76 of the nose preferably exceeds the diameter 78 at all points. The cleaning system comprises a jaw 94 which conforms to the nose, best shown in FIG. 16. In its simplest form, this jaw 94 may be a piece of sheet metal with a cutout 96 on one edge. Preferably, the thickness 95 of the jaw 94 will be much smaller than the length 76 of the nose. In one embodiment, the thickness 95 is less than one tenth the length 76. For a cylindrical nose, the cutout 96 should be round and have a diameter 98 that closely matches the diameter 78 of the cylindrical or conical nose 72. The preference for a cylindrical nose 72 is easily understood as allowing the diameter 98 of the cutout 96 to match the diameter 78 of the nose 72 along its entire length 76. When the jaw 94 is brought into contact with the nose 72, the cutout 96 closely conforms to the nose 72, and then when the jaw 94 is moved along the length 76 of the nose 72 towards the end 74, it scrapes any built-up material or contaminants off.

In one embodiment, two jaws 94 are employed, each scraping one half of the nose 72. The jaws 94 travel down the nose 72, each cleaning its respective half of the nose 72. The jaw 94 may be made of any material with sufficient stiffness. Preferably, it is either manufactured from, or coated with, a nonstick material that facilitates removal of solidified feedstock from them. Examples of such materials are PTFE, HDPE, nylon, and ultra-high molecular weight ("UHMW") polymers. All of these substances are well known in the art as being nonstick. In a preferred embodiment, the jaws are steel plated with electroless nickel plating infused with PTFE.

To minimize problems during the printing of multiple materials on a single workpiece, it is advantageous to clean printheads 46 between printing steps, with minimal interruption in the overall process. The mounting of printheads 46 on a turret 60 can facilitate this cleaning. A cleaning station 104 may be positioned in a location easily accessible to a printhead 46 on the turret 60, as best shown in FIG. 7. It is possible to position a cleaning station so that it may clean the printhead 46 while it is in the printing position 106 (that is, at the lowest point on the turret 60). This is consistent with the construction of cleaning stations on single-printhead printers, which are typically found in a corner of the machine away from the printing area. However, this entails a sacrifice of printing area, as it means that a portion of the print bed which is accessible to the printhead 46 is reserved for cleaning rather than printing.

In a preferred embodiment, the cleaning station 104 is located so that it may easily reach a printhead 46 that is not in the printing position 106. When the turret 60 rotates a printhead 46 out of the printing position 106, it moves it either forward or backward relative to the print bed 17. Thus the printhead 46 may be positioned away from the print bed 17 for cleaning, but the whole print bed 17 is still available for printing. In a preferred embodiment, best shown in FIG. 7, a cleaning station is located on the turret arm 61. The jaws 94 emerge from the turret arm 61 and are angled so that they may clean the nose 72 of the printhead 46 while it is away from the printing position 106. The positioning of the printhead 46 where it is reachable by the jaws 94 is referred to as the cleaning position 108.

As best shown in FIGS. 8 and 9, one embodiment of the cleaning station 104 is operated by two actuators. The cleaning actuator 126 moves the jaws from a retracted position 128 to an extended position 130. The jaw actuator 132 closes the jaws 94 around the nose 72, and the jaws 94 then move backward to the retracted position 128, scraping the nose 72 clean. The actuators 126, 132 may be any device which can provide the necessary motion, such as servo motors, pneumatic cylinders, or solenoids. In one embodiment, they are both solenoids and are assisted by springs (not shown). One spring biases the entire cleaning station 104 backward towards the retracted position 128. When cleaning actuator 126 is a solenoid, it serves to push the cleaning station 104 outward when energized, and the return to the retracted position 128 occurs entirely under spring pressure. Another spring biases the jaws 94 open, and the jaw actuator 132, when energized, pushes them closed. Thus, in this embodiment, the default position of the cleaning station 104, when no electricity is provided to it, is retracted with the jaws 94 open.

To secure the printhead 46 in the cleaning position 108, stop surfaces similar to those used to secure it in the printing position 106 may be used. This may take a variety of forms. The cleaning station 108 may be arranged so that when the frame stop surface 86 engages the turret stop surface 84 and locks a first printhead 46 in the printing position 106, a second printhead is locked into the cleaning position 108. This system is preferred for simplicity. Alternatively, each printhead 46 may have two turret stop surfaces 84, one which, when engaged with the frame stop surface 86, locks the printhead 46 into the printing position 106, and the other which locks it into the cleaning position 108. Finally, two frame stop surfaces may be employed, one locking the printhead 46 in the printing position 106 and the other in the cleaning position 108, using the same turret stop surface 84 for both operations. Although positioning is not as critical for the cleaning operation as for printing, it is still desirable to lock the turret 60 in position during cleaning, especially when employing a tensioner. Inadvertent rotation could result in damage to the nozzle 46, jaws 94, and other parts.

Preferably, cleaning occurs immediately before a printhead 46 is used to print. Also preferably, cleaning is preceded by a priming and purging step. In order to minimize print errors, the nozzle 64 should be completely filled with melted feedstock 44. The presence of bubbles will result in unwanted voids in the final product. It is therefore advantageous to force all air out immediately before printing. This is accomplished in a preferred embodiment by first moving the nozzle 64 to the purge position 138. A purge block 134 is placed firmly against the nose 72, and the pull motor 62 forces feedstock 44 into the heated nozzle 64. The feedstock 44 melts and exits the nozzle 64. The purge block 134 prevents the melted feedstock 44 from escaping easily, resulting in back pressure within the nozzle 64. This helps to force out any trapped air and ensure that the nozzle 64 is fully filled with melted feedstock 44.

The purge step results in a blob 136 of feedstock 44 forming on the nose 72 as material is forced through a small gap between the purge block 134 and the nose 72. After the purge step, the turret 60 may be immediately rotated to the cleaning position 108, and the cleaning step described above executed to remove the blob 136. The printhead 46 is now optimally prepared for printing, having had internal air purged and external contamination removed. Preferably it is immediately rotated to the printing position 106 and used for printing.

In a preferred embodiment, the purge block 134 is mounted directly above the jaws 94, and moves with them, so that when the jaws are in the extended position 130, the purge block 134 is also extended. In this way, the cleaning actuator 126 may be used to press the purge block 134 against the nose 72. The preferred steps are: 1) rotate printhead 46 to purge position 138. 2) Move purge block against nose 72 with cleaning actuator 126. 3) Energize pull motor 62 to force feedstock 44 and air out of nozzle 64, forming blob 136. 4) Retract purge block 134. 5) Rotate printhead 46 to the cleaning position 108. 6) Open, extend, close, and retract jaws 94 to remove blob 136 and any other contaminants from nose 72. 7) Rotate printhead 46 to printing position 106 to print.

One defect inherent of FDM printing is the creation of step contours 139. Because every printed layer has a finite thickness, a surface designed to form a smooth slope is actually a series of steps. All steps typically have the same vertical thickness, with the slope of the surface being approximated by adjusting the horizontal spacing between the steps. Thus a workpiece 141 viewed from the correct angle resembles a topographical map, with contours of uniform height. In addition, because the liquid feedstock 44 does not emerge from the nozzle 64 nor solidify as a perfect rectangle, typically both vertical and horizontal surfaces, although lacking step contours 139, will have a ridged texture. Both the step contours 139 and the ridged texture are undesirable for many reasons. When these textures appear in a shoe or prosthetic device, it may irritate the skin of a wearer. When found in a medical implant such as an artificial joint, they may cause friction, uneven movement of the joint, and undue wear on the corresponding surface. If both surfaces have the same character, they may actually interlock with one another and halt joint movement altogether. In many contexts, the presence of small ridges can make cleaning difficult and promote bacterial growth. It is therefore desirable to smooth the surface of an FDM printed workpiece 141.

Various techniques for smoothing are known. For workpieces 141 susceptible to solvents, it is known to brush or spray them with solvent, or expose them to solvent vapor, thereby dissolving the smaller peaks 150 and causing material to flow into the valleys 152 of the workpiece 141. Thermoplastics may also be subject to heating for the same purpose, whether in ovens that heat surrounding air, from radiant sources that apply infrared light, or from direct application of flame. Hard surfaces may be polished by abrasive techniques. These solutions are unsatisfactory for several reasons. Solvent and heat methods do not permit control of tolerances to maintain a precisely manufactured shape, can cause large-scale warpage, and unless carefully designed and subject to rigorous process controls, will inevitably result in different levels of smoothing on different parts of a workpiece 141. Abrasives are difficult to use successfully on elastomeric materials, and for workpieces 141 that are not flat or very simple curves, nearly impossible to use evenly. Furthermore, abrasives typically require a multi-step process moving from coarse to fine to achieve acceptable results.

For a thermoplastic workpiece 141, the meltable character of the material may be exploited to produce a greatly enhanced surface finish in a single operation. For several years the users of 3D printers have experimented with a technique known as "ironing," in which the nozzle 64 of a printhead 46 is heated and moved over a workpiece 141 without extruding feedstock 44 to smooth the step contours 139. This technique has provided an improvement in the printed results for some users, but is at best an improvised solution with improvised results. It is also ineffective with a elongate nose 72 such as is described in this application.

Figure 18:
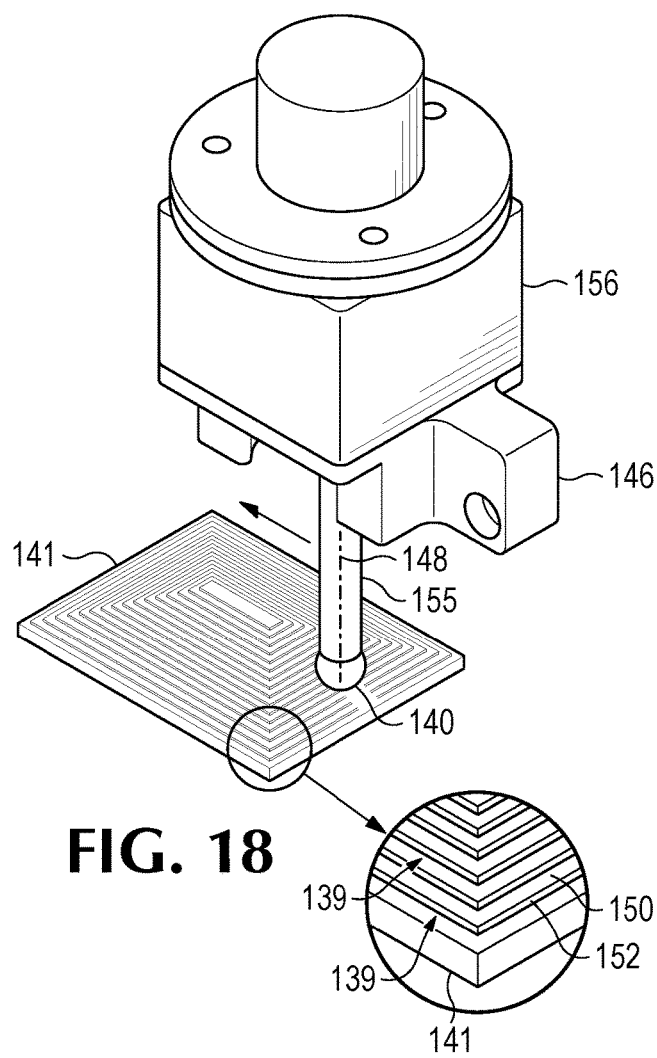
FIG. 18 is a perspective view of a rubbing tool and workpiece, showing the tool in use smoothing the surface of the work piece by moving perpendicular to the step contours of the workpiece.

A superior result in surface finish can be provided on multi-head 3D printer using a purpose-built rubbing tool. In a preferred embodiment, a rubbing tool 140 is mounted on a distal end of an elongate shaft 142. The proximate end 144 of the shaft is secured to a machine tool such as that described in this application by a bracket 146, as best shown in FIG. 18. The actuators (not shown) that move useful devices are then able to precisely control the position of the rubbing tool 140 in three dimensions. Preferably, this rubbing tool 140 has a convex cross-section in a plane perpendicular to an axis 148 of the elongate shaft 142. This assures that the rubbing tool 140 will be able to contact the workpiece regardless of where it is located in the plane through which the cross section was taken. However, it may be advantageous to have the rubbing tool 140 have a concave cross section in a different plane, for instance, in a plane in which the axis lies. This might simplify the smoothing of undercut surfaces by allowing the tool to reach around them.

The shape of the rubbing tool 140 can be chosen based on the application. For instance, when smoothing a conical surface, a conical rubbing tool 140 with the angle of the tool matched to the angle of the surface may be advantageous. A workpiece 141 with a rounded corner might be smoothed with a quarter-round tool. Usually it will be preferable for the rubbing tool to have a circular cross-section in a plan perpendicular to the axis 148, to simplify the calculation of tool paths.

In one embodiment, the rubbing tool 140 is a sphere. This design greatly simplifies the calculation of a toolpath and, when the diameter of the sphere is larger than the dimensions of the elongate shaft 142 in a plane perpendicular to the axis 148 of the shaft, allows for limited smoothing of undercuts. Preferably, the rubbing tool 140 is smooth and highly polished and coated with an anti-friction and anti-adhesive coating. This is particularly important when smoothing elastomeric materials. As has been previously discussed, elastomeric materials are more prone to a glue-like, sticky consistency, and if they were to adhere to the rubbing tool 140, the workpiece 141 could be ruined. In one embodiment, the coating is electroless nickel plating infused with PTFE.

Figure 17:
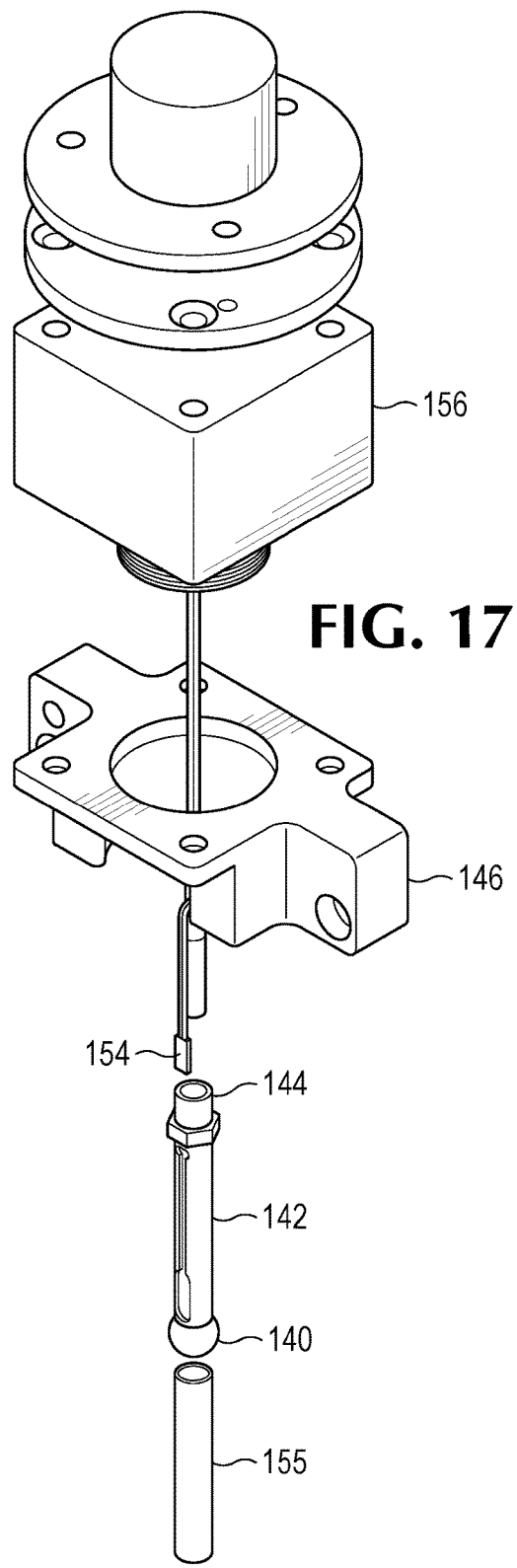
FIG. 17 is an exploded view of a rotating rubbing tool, showing the tool, the shaft on which it is mounted, a motor for rotating the tool, a bracket for mounting it, and a temperature sensor.

In use, the rubbing tool 140 is heated, placed proximate the workpiece 141, and then moved across the surface by the actuators of the machine tool, as shown in FIG. 18. The warm rubbing tool 140 softens the thermoplastic of the workpiece 141, and then pushes the softened material away from the peaks 150 and into the valleys 152 formed by the step contours 139. In this way, the surface is pushed closer to the designed smooth shape. Preferably, the rubbing tool 140 has a temperature control feedback loop so that it may be brought to a precise temperature. A sensor 154 should be mounted close to the rubbing tool 140 to provide continuous temperature feedback, as best shown in FIG. 17 This sensor 154 may be a thermistor, thermocouple, or other device capable of providing an electrical signal in response to temperature changes. Many such devices are known in the art. In one embodiment, the sensor 154 is held in place by heat-shrink tubing 155, which may be easily installed and also easily cut away should it be necessary to repair or replace the elongate shaft 142 or the sensor 154. Preferably, the temperature of the rubbing tool 140 is less than 30 degrees Celsius, and more preferably about ten degrees Celsius, below the melting point of the thermoplastic material in the workpiece 141. This allows for softening without actual melting of the material, so that it may be re-formed by pressure without uncontrolled flow and loss of tolerances that full melting would cause. If necessary the smoothing operation may be completed in multiple steps, each bringing the workpiece closer to the final dimensions.

Preferably, the rubbing tool 140 is moved perpendicular to the step contours 139, the better to move material from the sharp peaks 150 to the recessed valleys 152. For compound curves and irregular shapes, varying angles will be necessary. When a rubbing tool 140 has been specifically designed for a particular workpiece 141, such as the conical or quarter-round rubbing tools 140 mentioned above, movement parallel to the step contours 139 may be found to be advantageous.

In one embodiment, the rubbing tool 140 is rotated during the smoothing operation. This can most easily be controlled by the use of a stepper motor 156, but any motor that can maintain an approximately steady speed may be used. Rotation has the advantage of reducing the probability of adhesion of thermoplastic to the rubbing tool 140, as well as causing a greater displacement of material for more complete smoothing in a single pass. This is an advantage for relatively thick workpieces 141, but could cause damage to thinner ones. The use of rotation will therefore depend on the application.

Yet another use for a rubbing tool 140 is the formation of new shapes in a forging process. In metalworking, it is well known that processes such as forging and cold-forming of threads results in stronger finished products than cutting, because the grain structure of the metal is pulled into a new shape rather than being cut across. A related phenomenon can occur with FDM parts. The bond between layers in an FDM workpiece is typically weaker than the bond within the layer. When an FDM workpiece 141 is pushed into a new shape, the resultant product is stronger for two reasons: first, the bonds between layers are strengthened by heat and pressure, and second, the layers themselves, like the grain structure of a metal, are stretched to cover more of the new shape than they would have had the shape been formed by simple printing.

A heated rubbing tool 140 may be used for the forging process by, for instance, printing a simple thick-walled cylinder, inserting the heated rubbing tool 140 into the center, and applying outward pressure while moving the rubbing tool 140 in a circle. This will expand the diameter of the cylinder while compressing the layers of deposited material together. The process may be allowed to run until, for instance, an open cup shape is formed. This cup could then become part of a prosthetic designed to receive a portion of a patient's limb. The use of 3D printing allows for the economical creation of a single, perfectly fitted prosthetic, but the forging process results in a much stronger and much smoother finished product than direct FDM printing could achieve.

The use of a rubbing tool 140 as part of a turret-based multi-printhead machine tool has the great advantage that it is not necessary to move the workpiece 141 before smoothing. Thanks to the design of stop surfaces 84, 86 described above, it is possible to know with high precision the location of the workpiece 141 relative to the rubbing tool 140, calculate a toolpath, and complete a smoothing operation immediately after printing, with no human intervention.

It will be appreciated that many aspects of the invention, while applied to a 3D printer in a preferred embodiment, may be used in other embodiments. For instance, a counterweight system could be used to control the positioning of a rotary tool change apparatus useful for conventional machining, and a sharpening station, rather than a cleaning station, could be used for cutting tools. Therefore it will be understood that the scope of the invention is limited only by the claims which follow.

The invention claimed is:

1. A 3D printer, comprising:
    a nozzle, said nozzle having a nose, wherein the nose has an end and a length, wherein the nose includes an orifice in the end of the nose through which fluid may pass, wherein the length of the nose extends away from the end of the nose that includes the orifice;
    a purge block, wherein the 3D printer is configured to hold the purge block near the nose while fluid is extruded from the orifice during purging, wherein the 3D printer is configured to form a buildup of material on the nose during purging by forcing fluid through a small gap between the purge block and the nose, wherein a cleaning actuator is configured to press the purge block against the nose and hold the purge block near the nose while fluid is extruded from the orifice during purging;
    a cleaning mechanism comprising a plurality of jaws, each jaw being configured as to closely conform to the nose when placed in contact with it, wherein the nose and the jaws are capable of relative motion along the length of the nose, wherein each jaw is configured to scrape the buildup of material off the nose as it moves along the length of the nose towards the end of the nose; and
    an actuator configured to open and close the jaws, wherein the jaws do not contact the nose in an open position, wherein the jaws are pressed against the nose in a closed position.

2. The 3D printer of claim 1, wherein the jaws have a thickness, said thickness being less than the length of the nose.

3. The 3D printer of claim 2, wherein the thickness is less than one tenth the length of the nose.

4. The 3D printer of claim 1, wherein the actuator is configured to move the jaws along the length of the nose towards the end of the nose until the jaws are no longer in contact with the nose.

5. The 3D printer of claim 1, wherein the nose is cylindrical.

6. The 3D printer of claim 1, comprising a plurality of nozzles.

7. The 3D printer of claim 6, wherein the plurality of nozzles are mounted on a turret, the turret capable of rotation about an axis.

8. The 3D printer of claim 7, wherein the turret can be rotated to place each nozzle in the same position proximate to the jaws.

9. The 3D printer of claim 8, comprising:
    a. a plurality of turret stop surfaces mounted on the turret, each nozzle having at least one corresponding turret stop surface;
    b. a frame stop surface mounted adjacent the turret;
    c. wherein the stop surfaces are so placed that when one of the turret stop surfaces engages the frame stop surface, the turret is prevented from rotating;
    d. wherein the frame stop surface is so located that when one of the turret stop surfaces engages the frame stop surface, the corresponding nozzle is positioned adjacent the jaws.

10. The 3D printer of claim 9, wherein each nozzle has a plurality of corresponding turret stop surfaces, and wherein the turret stop surfaces are so placed that when at least one of the turret stop surfaces engages the frame stop surface, the corresponding nozzle is position in a position appropriate for printing.

11. The 3D printer of claim 1, wherein the 3D printer is configured to extrude elastomeric material through the orifice in the end of the nose.

12. The 3D printer of claim 1, wherein a cleaning actuator is configured to move the jaws to a position near the nose and move the jaws along the length of the nose toward the end of the nose.

13. The 3D printer of claim 1, wherein the actuator is configured to close the jaws when energized.

14. The 3D printer of claim 1, wherein the jaws are made of a rigid material.

15. The 3D printer of claim 14, wherein the jaws are made of a nonstick material or the jaws are coated with a nonstick material.

16. The 3D printer of claim 1, wherein the nose has a substantially conical shape, wherein the jaws substantially surround the nose when the jaws are in the closed position.

17. The 3D printer of claim 1, wherein the purge block is mounted proximate the jaws.

18. The 3D printer of claim 17, wherein the cleaning actuator is configured to move the purge block and the jaws relative to the nose.

* * * * *